US006760716B1

(12) United States Patent
Ganesamoorthi et al.

(10) Patent No.: US 6,760,716 B1
(45) Date of Patent: Jul. 6, 2004

(54) ADAPTIVE PREDICTIVE MODEL IN A PROCESS CONTROL SYSTEM

(75) Inventors: Sai Ganesamoorthi, Austin, TX (US); Terrence L. Blevins, Round Rock, TX (US); Vasiliki Tzovla, Austin, TX (US); Wilhelm K. Wojsznis, Round Rock, TX (US); Ashish Mehta, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 513 days.

(21) Appl. No.: 09/590,630

(22) Filed: Jun. 8, 2000

(51) Int. Cl.[7] .............................................. G06F 15/18
(52) U.S. Cl. ......................................... 706/21; 706/14
(58) Field of Search ............................... 706/20–23, 14

(56) References Cited

U.S. PATENT DOCUMENTS

| | | | | |
|---|---|---|---|---|
| 4,054,780 A | | 10/1977 | Bartley et al. ............... | 364/106 |
| 5,659,667 A | * | 8/1997 | Buescher et al. ............. | 706/23 |
| 5,673,368 A | * | 9/1997 | Broese et al. ................. | 706/23 |
| 5,680,409 A | * | 10/1997 | Qin et al. .................... | 714/799 |
| 5,682,317 A | * | 10/1997 | Keeler et al. ................ | 701/101 |
| 5,727,128 A | * | 3/1998 | Morrison ..................... | 706/45 |
| 5,842,189 A | * | 11/1998 | Keeler et al. ................. | 706/16 |
| 5,877,954 A | * | 3/1999 | Klimasauskas et al. ....... | 700/29 |
| 6,484,133 B1 | * | 11/2002 | Vovt .......................... | 702/190 |

FOREIGN PATENT DOCUMENTS

GB            2186715 A     8/1987

OTHER PUBLICATIONS

Microelectronics (Digital and Analog Circuits and Systems), Jacob Millman, Ph. D., Copyright © 1979 McGraw–Hill Inc.*

Design of switched–capacitor FIR filters with application to a low–power MFSK receiver Dabrowski, A.; Menzi, U.; Moschytz, G.S.; Circuits, Devices and Systems, IEE Proceedings G, vol.: 139, Issue: 4, Aug. 1992 pp.:450–466.*

Mixed analog/digital, FIR/IIR realization of a linear–phase lowpass filter Qiuting Huang; Solid–State Circuits, IEEE Journal of, vol.: 31, Issue: 9, Sep. 1996 pp.: 1347–1350.*

100 tap FIR/IIR analog linear–phase lowpass filter Qiuting Huang; Maguire, P.T.; Burger, T.; VLSI Circuits, 1995. Digest of Technical Papers., 1995 Symposium on, Jun. 8–10, 1995 pp.: 91–92.*

Feasibility and performance study of dependency inference [database design] Bitton, D.; Millman, J.; Torgersen, S.; Data Engineering, 1989, Proceedings. Fifth International Conference on, Feb. 6–10 1989 pp.: 635–641.*

The Use of Adaptive Algorithms for Obtaining Optimal Electrical Shimming in Magnetic Resonance Imaging (MRI), Jeff Wilkins and Steve Miller, Member, IEEE, IEEE Transactions on Biomedical Engineering, vol. 36, No. 2, Feb. 1989, pp. 202–210.*

Adaptive Propagation Modeling Based On Neural Network Techniques, Bernard Gschwendtner and Friedrich Landstorfer, Fellow, IEEE, 1996 IEEE.*

* cited by examiner

*Primary Examiner*—Leo Picard
*Assistant Examiner*—Michael B. Holmes
(74) *Attorney, Agent, or Firm*—Marshall, Gerstein & Borun LLP

(57) ABSTRACT

An adaptive predictive model includes a standard predictive model, such as a neural network or a natural model, constructed to produce an output that predicts a process parameter and a combiner network that combines the output of the predictive model with one or more measured values of the process parameter to produce an adjusted predicted process parameter during operation of a process. The adaptive predictive model reduces or corrects for non-linear as well as linear errors in the prediction of a process variable without having to reform the predictive model itself, while requiring only minor increases in processing power and time.

44 Claims, 3 Drawing Sheets

ADAPTIVE PREDICTIVE MODEL IN A PROCESS CONTROL SYSTEM

BACKGROUND OF THE INVENTION

The present invention relates generally to the use of predictive models in process control systems and, more particularly, to adaptively adjusting the output of a predictive model using process parameter measurements.

DESCRIPTION OF RELATED ART

In many areas of the process control industry, it is common that a critical parameter such as the composition of a fluid or gas flow may be difficult to measure or may only be measurable using off-line techniques. Often times, such parameters are obtained by off-line lab analysis or by the use of an on-line analyzer that is difficult to maintain on a continuous basis or is unreliable. When an estimate of the critical parameter is needed for some reason, such as to perform process control, any of a number of various mathematical techniques have been used to create a process model that predicts the hard-to-measure process parameter based on process inputs or parameters that may be easily measured or ascertained during process operation.

More particularly, it is generally known to use one or more predictive models such as a non-parametric model (e.g., neural network models), a natural model (e.g., first principle models) or a parametric model (obtained by regression techniques) within process control systems to estimate process parameters. One use of a predictive model is as a virtual sensor which can be used to estimate or predict the output of a fictitious sensor at some point within a process control system. As indicated above, a virtual sensor is typically used when it is difficult or impossible to locate a real sensor at the desired process location. A virtual sensor can also be used to predict process parameters for which no real sensors exist, e.g., to measure parameters such as smell or taste that require a judgement on the part of an operator to determine. Another use of a predictive model is as a cross analyzer to check the correct operation of a sensor within a process. For example, if the cross analyzer and the sensor produce different enough measurements, it may be an indication that the sensor has failed in some manner.

As is known, neural network predictive models are constructed from sets of training data, wherein each set of training data has a value for each of a number of process inputs/outputs (which are the inputs to the model) and a value of the process parameter being predicted or estimated. After being developed from the training data, the neural network model is then used within the process control system environment to predict the process parameter, even though an actual sensor is taking no or only limited measurements of the parameter during process operation. First principle or natural models typically use one or more mathematical equations to model the behavior of the phenomena being predicted.

Predictive models when used to predict the value of a process control variable are subject to various types of errors, such as bias errors, drift errors, non-linear errors, etc. Bias errors are errors in which the output of the model has a bias or offset with respect to the value of the actual process parameter being predicted. Bias errors can be mathematically represented in the form of $y=x+B$, wherein y is the predicted or modeled process parameter value, x is the actual process parameter value and B is the bias. Drift errors are errors that are linear or are proportional to the value of the process parameter being modeled and can be represented in the form of $y=Ax$, wherein A is the drift error multiplier. Non-linear errors are errors which are non-linear with respect to the actual process parameter and can be mathematically represented in the form of $y=f(x)$, meaning that the predicted value y is a non-linear function of the actual value x. Non-linear errors occur for any number of reasons but often result from the fact that the predictive model is inadvertently created to have some non-linear error component therein. For example, a natural model may not account for higher order (second, third, etc.) effects of the phenomena being modeled, a neural network model may be created from an incomplete or inadequate set of training data, etc., resulting in the output of the model having some non-linear error component. Besides inadequacies in the model, these errors may also be caused by changes in the process equipment or unmeasured process inputs, such as feed stock composition, that may directly impact the process output. Because unmeasured process inputs and changes in process operation are common within the process control industry, the application of neural networks, first principal models, or other commonly available predictive models have had limited commercial success in providing a reliable prediction of critical process outputs.

In the past, the only way to correct for linear or non-linear errors caused by mismatch between the developed model and the actual process was to reform the model using different or more accurate equations, using a different or more complete set of training data, etc. The process of recreating or reforming a predictive model is time consuming, usually requires an expert, can require enormous amounts of processing power and time and cannot typically be done in real time process operation. Still further, there is no guarantee that the prediction of the newly developed predictive model will be free of errors. Thus, instead of adaptively correcting the output of a predictive model used in, for example, a process control system, the predictive capability of a predictive model has been periodically checked by taking actual measurements of the process parameter being predicted and comparing these measurements with the output of the predictive model. One or more of such comparisons were typically used to determine if the model prediction had errors therein. However, the comparisons were not used to adapt the model. Instead, these comparisons were used to determine if the model produces an output that is tolerable and, if not, to reform the model using conventional model forming techniques.

SUMMARY OF THE INVENTION

The present invention is directed to adaptively modifying or adjusting the output of a typical predictive model, such as a neural network model or a natural model, using actual process measurements to thereby reduce or correct for non-linear as well as linear errors, without having to reform the predictive model itself. Such an adaptive predictive model can be easily implemented within a process on a continuous basis during operation of a process control system with only minor increases in the processing as compared with standard predictive models. Generally speaking, the adaptive predictive model uses measured process inputs in conjunction with process parameter measurements obtained by, for example, a lab sample or analyzer, on a continuous, a periodic or even a non-regular or non-periodic basis to adapt the output of a standard predictive model. Using this feedback mechanism, the predicted value of the process parameter may be automatically adapted to compensate for unmeasured disturbances and changes in process operation.

According to one aspect of the present invention, an adaptive predictive model for use in estimating a process parameter includes a predictive model configured to receive one or more model inputs and to produce a predicted value of the process parameter based on the one or more model inputs and a measurement input configured to receive a measurement of the process parameter. The adaptive predictive model also includes a combiner network coupled to the measurement input to receive the process parameter measurement and coupled to the predictive model to receive the predicted value of the process parameter. The combiner network combines the process parameter measurement with the predicted value of the process parameter to produce an adjusted predicted value of the process parameter.

The combiner network may include a correction block that determines a correction factor and a summer that sums the correction factor to the predicted value of the process parameter to produce the adjusted predicted value of the process parameter. The correction factor may be generated by a correction block that includes a delay unit coupled to the predictive model to delay the predicted value of the process parameter by, for example, a sample delay to make it time coincident with the current process parameter measurement. The result of the comparison may be processed and filtered to generate the correction factor which is summed to the current output of the predictive model to generate an adjusted value for the current time. The same correction factor may be maintained and summed with subsequent outputs of the predictive model until a new process parameter measurement is available.

In another embodiment, the combiner network includes a delay unit coupled to delay the predicted value of the process parameter, a multiplication unit that multiplies the delayed predicted value of the process parameter and the process parameter measurement by regressive least square coefficients and a summer that sums the multiplied delayed predicted value of the process parameter and the multiplied process parameter measurement to produce the adjusted predicted value of the process parameter.

According to another aspect of the present invention, a method of adjusting an output of a predictive model that produces an estimate of a process parameter during operation of a process based on a series of inputs delivered to the predictive model includes the steps of measuring the process parameter during operation of the process to produce a process parameter measurement, producing a correction factor using the measurement of the process parameter and combining the correction factor with the output of the predictive model to produce an adjusted predictive model output that estimates the process parameter.during operation of the process.

DESCRIPTION OF THE PREFERRED EMBODIMENTS

Figure 1:
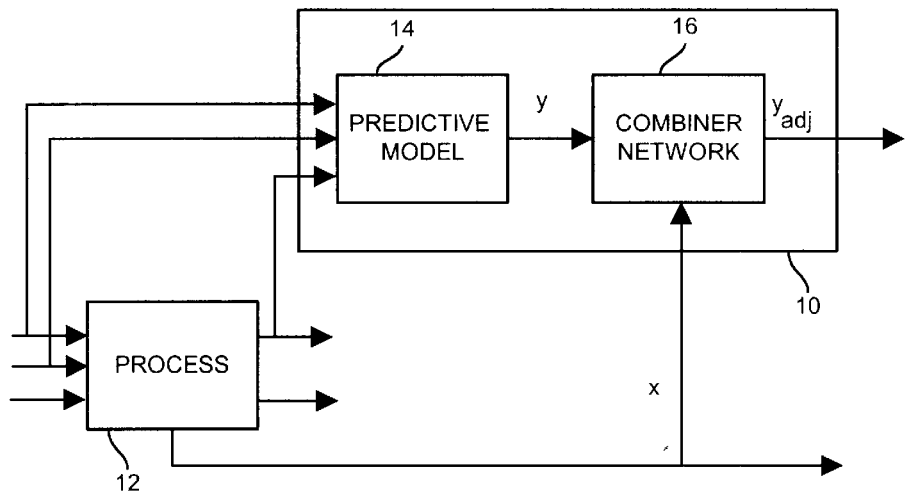
FIG. 1 is a block diagram of an adaptive predictive model coupled to a process.

Referring now to FIG. 1, an adaptive predictive model 10 is coupled to a process 12, which may be any desired type of process including, for example, a continuous process or a batch process. The adaptive predictive model 10 includes a typical or known predictive model 14 having an output y thereof coupled to a combiner network 16. The predictive model 14 may be, for example, a non-parametric model (such as a neural network model), a natural model (such as a first principle model), a parametric model (such as obtained using regression techniques) or any other desired type of predictive model. The predictive model 14 has inputs communicatively connected to appropriate inputs and/or outputs of the process 12, as is usually the case with predictive models. Of course the predictive model 14 may be formed in any desired or known manner and may use, as inputs, any of the inputs to the process 12, any of the measured parameters or process parameters produced by the process 12, or any other inputs, as desired or necessary in any particular circumstance. The output y of the predictive model 14 may predict or estimate the value of any desired signal, quantity, parameter or other phenomena. (referred to herein as the process parameter x) within or related to the process 12. Thus, for example, the predictive model 14 may be a virtual sensor, a cross analyzer, etc. As discussed above, however, the output y typically needs to be corrected for non-linear errors, bias errors, drift errors or a combination thereof with respect to the actual process parameter x.

Measurements of the parameter x, which may be obtained within the process 12 using, for example, periodic or non-periodic measurements such as those obtained by network analyzers, lab analyzers, sensors or grab sample analyzers, or obtained in any other desired manner are provided to a measurement input of the combiner network 16 within the adaptive predictive model 10. If desired, analyzers or sensors measuring the process parameter x may be periodically connected to the process 12 to obtain appropriate samples of the parameter x and the measured values of the parameter x may then be provided to the adaptive predictive model 10. Of course, the measured values of the parameter x may be obtained and provided to the adaptive predictive model 10 at any time such as on a continuous or periodic basis. Likewise, the measured values for the parameter x may be taken at one or more times during operation of the process 12 but need not necessarily be taken on a continuous basis or even on a regular, periodic basis. However, the more measurements of the parameter x that are taken, the better the adaptive predictive model 10 will normally operate. Still further, the measurement input of the combiner network 16 may receive and store the measurements of the process parameter x.

During operation, the combiner network 16 compares or otherwise combines the output y with the measured value(s) of the process parameter x to produce an adjusted predicted value $y_{adj}$ which is an adjusted or corrected value of the predicted signal y. In effect, the combiner network 16 adaptively adjusts the output y based on limited actual measurements of the parameter x made during the operation of the process 12 to produce the signal $y_{adj}$. The output $Y_{adj}$ of the adaptive predictive model 10 may be used in the same way that the output y of the typical or standard predictive model 14 was used in the past. Thus, the adaptive predictive model 10 may be used in place of the predictive model 14 in most applications, and especially in those applications in which measurements of the actual process parameter x are capable of being made at some time during operation of the process 12.

Generally speaking, the combiner network 16 may delay (e.g. store) the output y of the model 14 by 'Delay' units and then compare the delayed or stored value y to a time coincident measured value of the parameter x to produce an error signal e. The error signal e may then be smoothed or filtered and combined with the value y in some manner to produce the adjusted value $y_{adj}$. In this manner, the output of the standard predictive model 14 can be adjusted during process operation with only minor amounts of processing, to produce a more accurate prediction having reduced non-linearity, bias and drift errors and without having to reform the process model 14. Still further, the combiner network 16 may operate continuously during operation of the process 12 even though the actual value of the process parameter x is only measured periodically or at various regularly scheduled or non-regular times so as to adjust the output y of the model 14 continuously during operation of the process 12.

Figure 2:
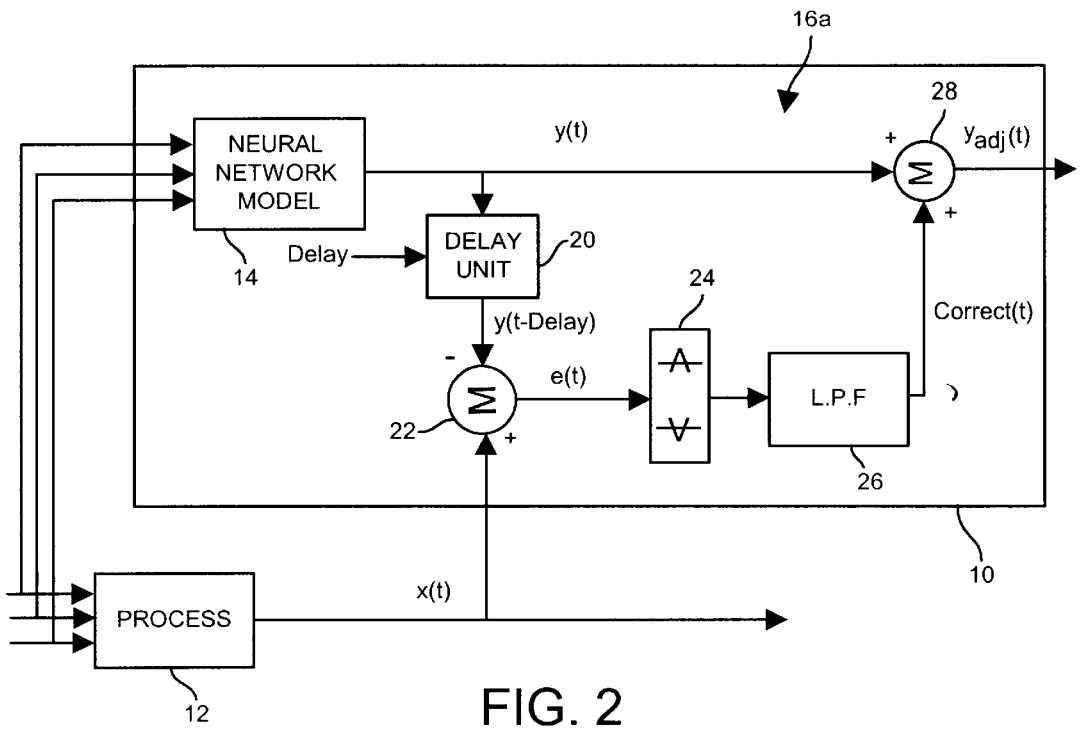
FIG. 2 is a detailed block diagram of an adaptive predictive model, having a first embodiment of a combiner network, coupled to a process.

FIG. 2 illustrates a block diagram of an adaptive predictive model 10 showing the details of one possible combiner network 16a in more detail. In FIG. 2, the predictive model 14 is illustrated as a feed-forward neural network model having the inputs thereof coupled to process inputs, as is typically the case for feed-forward neural network predictive models. Likewise, in FIG. 2, it will be understood that the process parameter x can be measured at different times by a network analyzer or any other sensing device or process and that the values of the parameter x are provided to a measurement input of the adaptive predictive model 10 in any desired manner, such as automatically or via operator input, and are stored as necessary. Additionally, an indication of the time at which the measurement was taken or the sample delay (called a Delay variable) is provided to the adaptive predictive model 10.

Generally speaking, the combiner network 16a includes a correction block that determines a correction factor and a combiner that combines the correction factor to the output y (or some scaled and/or delayed version thereof) to produce the adjusted output $y_{adj}$. In the embodiment of FIG. 2, the output y of the predictive model 14 is provided to a delay unit 20 which delays this signal by a delay set according to the Delay variable which may be, for example, determined by the operator based on when the measurement of the process parameter x took place or may be determined automatically by the delay unit 20. Typically, the value of the Delay variable will be set to the sample or measurement delay between the output y of the model 14 and the time at which the measurement of the process variable x corresponding to that sample is provided to the adaptive predictive model 10. Thus, strictly speaking, the output of the model 14 is y(t) while the output of the delay unit 20 is y(t-Delay). It will be understood that the delay unit 20 can be any desired type of delay unit, such as a delay line or a memory that stores digital values of the output y for different times.

The output y(t) of the delay unit 20 is provided to a negative (inverting) input of a summer 22 where it is subtracted from the measured process parameter x(t). The summer 22 produces an error signal e(t) which is a correction factor that reflects the difference between the actual value for the process parameter x at the time t and the predicted value of this parameter produced by the model 14 for the time t. Thus, in this case, the output of the summer 22 can be expressed as e(t)=x(t)−y(t-Delay).

Thereafter, the error signal e(t) is provided to a limit detector 24 with upper and lower bounds that prevent the error from taking on abnormally large or small values. Such situations can occur if the process measurement value x is suspect or if the predicted value y of the model is suspect. The process measurement value could be suspect if the sensor that is used to determine the value is erroneous or if there is a human error in determining the process measurement value x. A suspect prediction by the model could also result if the inputs to the model 14 (at the time t) which resulted in the output y(t) where outside of the limits used to create the predictive model 14. Improprieties in the model caused by inaccurate methods to create the model is another source of error and can occur even if the inputs are within the limits used in model creation. Under these circumstances, the user is preferably alerted with a flag or an error signal that the error limits were violated, indicating a suspect adjustment for the model prediction. In the case of a suspect adjustment or error, the limit detector 24 discards the error signal e(t) to prevent that error signal from being used to adaptively adjust the output y of the model 14. Of course, the limit detector 24 must store or track the error, for example, by using the limits of the measured process parameter x. This process can be easily accomplished using any appropriate memory or look up table. Still further, the user or operator may be able to set the limit values within the limit detector 24 to thereby control or restrict the impact of an erroneous measurement of the process parameter x on the adjusted predicted value $y_{adj}$.

If the inputs to the model 14 were within range at the time t, the limit detector 24 passes the value of the error signal e(t) to a filter 26 which may be, for example, a smoothing or other low pass filter used to smooth the transitions in the error signal e(t) to thereby create a smoother adjustment to the output of the model 14. In effect, the filter 26 offsets the effect of noise and high frequency transitions in the process parameter x. Preferably, the error factor e(t) is heavily filtered to, for example, two times the response horizon for a change in a process input. However, the rate of adaptation provided by the filter 26 may be changed to reflect different error environments and, typically, will be set based on the type of process in which the correction is being provided or the type of process parameter that is being predicted. Of course, the adaptive predictive model 10 can be constructed to allow a user to select the filtering coefficients to adjust the rate at which the predicted output y adjusts based on measured values of the process parameter x.

As illustrated in FIG. 2, the filter 26 creates a final correction factor Correct(t) and provides the Correct(t) signal to a summer 28 (the combiner) which, in turn, sums the correction factor Correct(t) with the output y(t) of the model 14 to produce the adjusted output $y_{adj}$. In this case, the adaptive predictive model 10 implements the equations provided below.

$$e(t) = x(t) - y(t\text{-Delay})$$

$$\text{Correct}(t) = a1 * \text{Correct}(t\text{-Delay}) + a2 * e(t)$$

$$y_{adj}(t+k) = y(t+k) + \text{Correct}(t) \text{ for } 0 \leq k < \text{Delay}$$

wherein:

Correct(t)=the correction factor for the time t;

y(t)=the predicted value produced by the model 14 at the time t;

x(t)=the actual value of the process parameter x at the time t as determined by an analyzer, lab analysis or other measurements;

$y_{adj}$=the adjusted predicted value of the process parameter x;

a1 and a2=coefficients of a filter (e.g., the filter 26); and k=execution rate of the predictive model.

It will be understood that the correction factor for the time t, e.g., Correct(t), is actually calculated with the value of y taken at the time t-Delay to adjust for the sample delay inherent in providing the actual measured value of the parameter x to the measurement input of the adaptive predictive model 10. Furthermore, in those cases where the measured values of the parameter x are provided only periodically or at non-periodic intervals, the error signal e(t) remains the same until a new value of x is supplied to the predictive model 10. However, due to the operation of the filter 26, the correction factor Correct(t) approaches some constant value until a new value of x is provided to the adaptive predictive model 10. However, the correction factor Correct(t) may be added continuously to the output y even at times for which no measurement of the process parameter x is taken. Of course the filter 26 and limit detector 24 may be any known digital or analog components.

Figure 3:
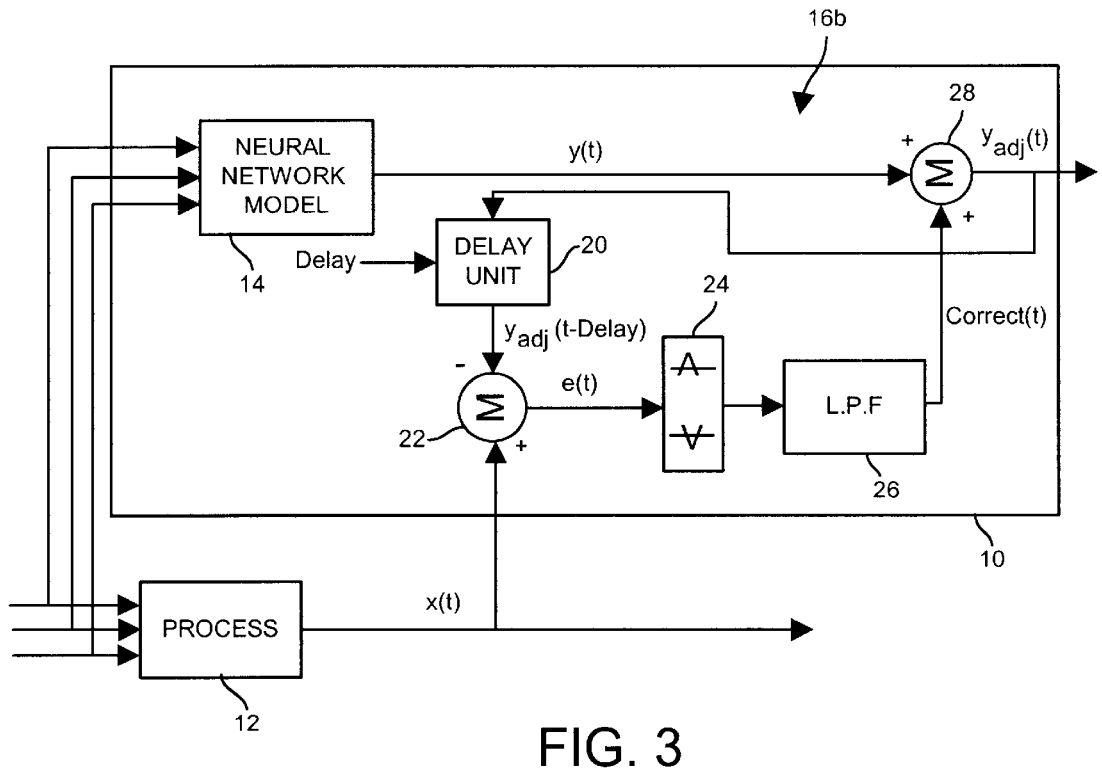
FIG. 3 is a detailed block diagram of an adaptive predictive model, having a second embodiment of a combiner network, coupled to a process.

Referring now to FIG. 3, a further combiner network 16b is illustrated for use with the adaptive predictive model 10. It will be noted that the combiner network 16b of FIG. 3 is the same and includes the same elements as the combiner network 16a of FIG. 2 except that delay unit 20 receives the adjusted output $y_{adj}$ of the summer 28 instead of the output y of the model 14. Thus, the error e(t) is determined from the corrected or adjusted predicted value of the model 10 instead of the uncorrected predicted value. The error signal e(t), the final correction factor Correct(t) and the adjusted output $y_{adj}$ for the process of FIG. 3 can be expressed as follows:

$$e(t)=x(t)-y_{adj}(t\text{-Delay})$$

$$\text{Correct}(t)=a1*\text{Correct}(t\text{-Delay})+a2*e(t)$$

$$y_{adj}(t+k)=y(t+k)+\text{Correct}(t) \text{ for } \leq k<\text{Delay}$$

From this discussion, it will be understood that either the output y of the model 14 or the adjusted output $y_{adj}$ of the adaptive predictive model 10 can be used as feedback to produce the correction factor Correct(t).

It should also be noted that the above correction block or combiner network representations are mere generalizations of a variety of forms that can be used for the same purpose. For example, these blocks may be extended to higher order filters to achieve better noise attenuation, especially in a sampled measurement case or can use any other linear or non-linear technique to implement correction of the output of the predictive model 14. Still further, the filter coefficients can be fixed, if the sources of error and sampling environment are known, or can be adaptable using known regression techniques, if desired.

Figure 4:
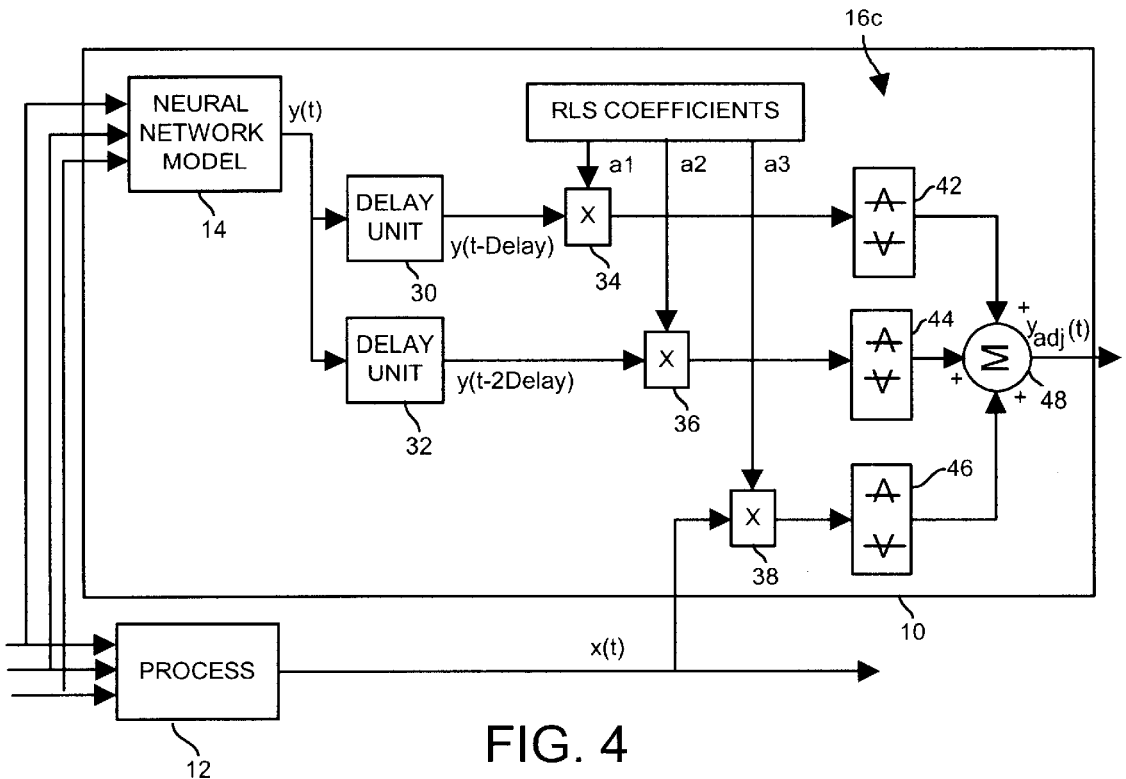
FIG. 4 is a detailed block diagram of an adaptive predictive model, having a third embodiment of a combiner network, coupled to a process.

Still further, error minimization techniques, such as recursive least squares (RLS), Newton-Raphson, Gradient descent, etc., can be used in the combiner network 16 and are very effective when there is a significant excitation or rapid change in the conditions of the process. Referring to FIG. 4, a combiner network 16c is illustrated using an RLS technique to produce the adjusted output $y_{adj}$ which may be calculated or determined in the following form:

$$y_{adj}(t+k)=a1*y(t\text{-}2*\text{Delay}+k)+a2*y(t\text{-Delay}+k)+a3*x(t\text{-Delay}) \text{ for } 0\leq k<\text{Delay}$$

wherein a1, a2 and a3 are RLS coefficients.

If desired, more than one time delayed term for the actual output (the parameter x) and the network outputs (the signal y) may be used to improve performance of the algorithm. As will be understood, the combiner network 16c of FIG. 4 uses an RLS algorithm to enhance performance. In particular, the output y of the model 14 is provided to delay units 30 and 32 (or any other number of delay units) which delay these values by, for example, the sample measurement delay. However, the delay unit 30 will, in this case, delay the y signal by one more time delay unit time than the delay unit 32. The outputs of the delay units 30 and 32 are provided to multipliers 34 and 36 while the actual measured process parameter x, for the time t, is provided to a multiplier 38. The multipliers 34, 36 and 38 multiply the inputs thereof by the RLS coefficients a1, a2 and a3, respectively, as determined by an RLS coefficient determining algorithm 40, which uses standard RLS techniques to calculate the coefficients a1, a2 and a3. The RLS algorithm 40 will determine a new set of coefficients each time a new measurement sample of the process parameter x is provided to the combiner network 16c.

The outputs of the multiplication units 34, 36 and 38 are provided to limit detectors 42, 44 and 46 which operate similar to the limit detectors 24 of FIGS. 2 and 3. Thus, the limit detector 42 determines if the predicted value at time t-Delay was within acceptable limits while the limit detector 44 performs the same function as the limit detector 42 for the predicted value at the time t-2* Delay. If the predicted value y at time t-Delay or at the time t-2* Delay is suspect for one or more of the reasons stated above, the error limits are violated, causing a flag or an error signal to be generated.

The outputs of the filters 42, 44 and 46 are then provided to a summer 48 which sums these signals together to produce the adjusted predicted value $y_{adj}$. In the system of FIG. 4, it will be noted that, once again, the output of the model 14 is combined in some manner with the actual measured process parameter x (although possibly at different delay times) to produce an adjusted output $y_{adj}$. The adjusted output $y_{adj}$ is determined by a direct combination of previous values of the model prediction y and the process measurement value x. The adjusted predicted value $y_{adj}$ can also be used in place of the model prediction y. As a result, the choice of the configuration can be changed to suit the process in question. Of course, similar techniques could be used for other types of filters and error correction schemes and it will be understood that the combiner network 16 is not limited to the embodiments illustrated herein. It will also be understood that any or all of the elements illustrated in FIGS. 1–4 can be separate hardware, software (program) or firmware elements developed or constructed in any desired manner, with the connections there-between representing the communication of signals or values between such hardware, software or firmware elements. Furthermore, in the example of FIG. 4, the delay units 30 and 32, the multiplication units 34 and 36, the limit detectors 42 and 44 and the summer 48 make up a combiner while the multiplication unit 38 and the limit detector 46 make up a correction block that produces a correction factor.

To test the operation of the adaptive predictive models illustrated herein under different scenarios, a number of real time process. models were run with and without the use of the combiner networks 16a, 16b, and 16c. In this simulation, neural networks for each process were first created by collecting real time process variables and designing and training a network using commercially available neural network creation software for use in process control applications. The selections of inputs and their corresponding delays were undertaken so that the selection would minimize the training error. The network was then trained until the maximum number of epochs was attained. A true test situation was simulated by dividing the data set collected from the process into separate training and validation samples. During verification, the same input data outlier limits were used so that all validation samples fell within the limits of the training range. For cases where execution of the network on the validation set did not yield satisfactory results, the network design was modified and retrained as would normally be the case in developing process models. This training process was done recursively to end up with a neural network model whose verification error was at a minimum.

The above-described combiner networks 16a, 16b and 16c were then applied to each network. A simple MATLAB program was used to verify the various combiner configurations. The results are illustrated in the following table.

| Name of Neural Net | RMS Network Error (without correction) | Combiner Network 16a of FIG. 2 | Combiner Network 16b of FIG. 3 | Combiner Network 16c of FIG. 4 |
|---|---|---|---|---|
| Aevap | 0.00277 | 0.000703 | 0.000529 | 0.00217 |
| Batch | 0.113568 | 0.038531 | 0.032437 | 2.00502 |
| tw11a | 0.011316 | 0.005523 | 0.005227 | 0.009221 |
| Grind2a | 0.1228 | 0.136584 | 0.131396 | 0.112771 |
| Grinder | 0.128294 | 0.107549 | 0.089305 | 0.079067 |
| quno | 0.177184 | 0.06604 | 0.04997 | 0.121587 |

In this table, Aevap is a corn syrup evaporator process, Batch is a batch process, tw11a is a $CO_2/NH_3$ scrubber column in a caprolactum process, Grind2a and Grinder are copper ore grinder processes and quno is a HeadBox pH on paper machine process. In most test cases it can be seen that the root mean squared (RMS) error of the corrected output for each of the combiner networks was lower than that of the output of the neural network model without correction. In most cases, there was significant error reductions. Thus, as will be understood, different networks, blocks or techniques for producing the adjusted output of the adaptive process model 10 could be used in any single process based on the type of process and previous determinations or experience pertaining to which type of filtering techniques or combining techniques work the best for that process.

Figure 5:
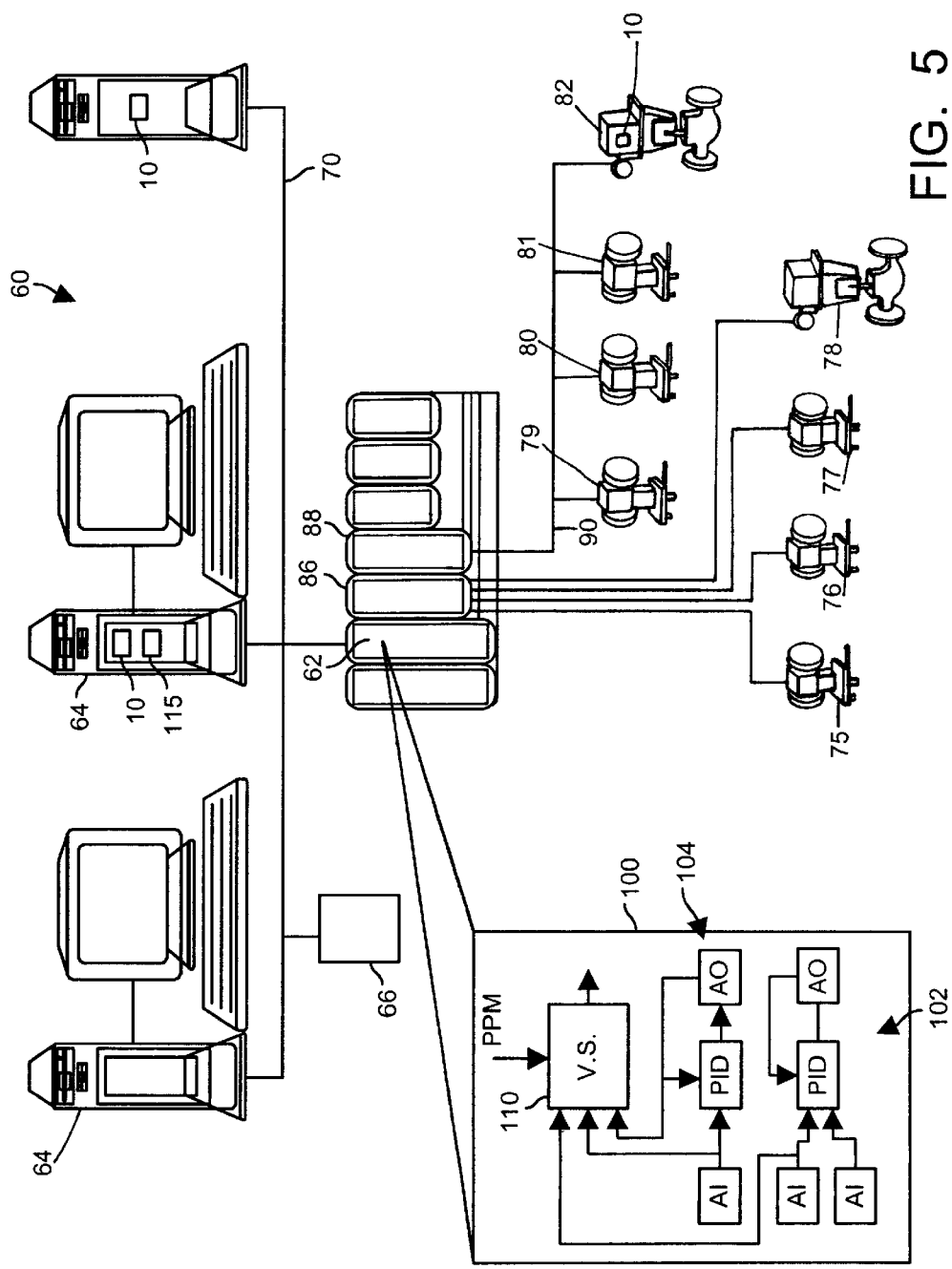
FIG. 5 is a block diagram of a process control network having one or more of the adaptive predictive models of FIGS. 1–3 therein.

Referring now to FIG. 5, a process control network 60 in which an adaptive predictive model 10 could be used is illustrated. The process control network 60, which may be, for example, a Delta V process control system sold by Fisher-Rosemount Systems, Inc. of Austin Tex., includes one or more controllers 62, a host or operator workstation 64, a data historian or data library 66 and/or other computer devices such as other workstations, databases, configuration stations, etc. connected to bus 70 which may be, for example, an Ethernet bus. As is known, the controller(s) 62 and workstations 64 include processors which implement software stored in memories of those devices. The controller 62 may be, for example, a distributed control system controller or any other type of controller implemented in, for example, a stand alone computer or in a network computer. The host device 64 may also be, for example, a personal computer or other device that allows a user or an operator to interface with the process control system 60 in any known manner. The data historian 66 may be any type of known memory or storage device including, but not limited to, a digital disk storage device (such those using compact disks, digital video disks, laser disks, etc.), a RAM storage device, a magnetic disk storage device, etc.

Numerous field devices 75–82 are illustrated as being connected to the controller 62 via any desired types of input/output (I/O) devices 86 and 88. The devices 75–78 are connected individually to the I/O device 86 and may be, for example, HART, standard 4–20 ma devices or any other type of smart or non-smart field device. Likewise, the devices 79–82 of FIG. 5 are illustrated as being connected to a bus 90 which may be any desired type of bus, such as a Fieldbus link. In this case, the devices 79–82 may use the Foundation Fieldbus communication protocol. Of course, each of the field devices 75–82 may be any type of field device used in the process control network 60 including, for example, sensors, control valves, positioners, fans, video cameras, microphones, etc. Of course, other devices may be connected to the system 60 in any desired manner.

As illustrated in FIG. 5, the controller 62 implements a process control scheme 100 or routine having a number of different loops or segments therein. Generally speaking, each control loop controls one or more of the field devices to control some part of a process. As illustrated in the box 100 of FIG. 5, the controller 62 may use what are commonly referred to a function blocks to implement control. As is known, function blocks (which are basically objects in an object-oriented programming environment) may be interconnected by communication links and operate to communicate with one other to thereby implement control. However, the controller 62 could use any other desired type of control techniques including, for example, ladder logic, sequential function charts, etc.

The controller 62 of FIG. 5 is illustrated as implementing two loops 102 and 104. The loop 102 has two analog input (AI) function blocks which operate to receive signals from devices, a proportional-integral-derivative (PID) control block which implements PID control based on the inputs provided thereto and an analog output (AO) function block which sends signals to or otherwise communicates with a device (such as a valve) to thereby control that device. The AO block also provides feedback to the PID block. Likewise, the loop 104 includes an AI function block coupled to a PID function block which is coupled to an AO function block to implement a second control loop within the process.

As also illustrated in FIG. 5, a virtual senor function block 110, which may be constructed using any of the adaptive predictive models of FIGS. 1–4, has inputs thereof coupled to the AI and AO blocks of loop 104 and to the AI function block of loop 102. The virtual sensor function block 110 uses these signals as inputs for producing a predicted value of a process parameter, which may be any desired process parameter. Of course, the selection of the particular inputs to the virtual sensor 110 will be dependent on the parameter being predicted and this selection process is known to those skilled in the art. The virtual sensor function block 110 also receives periodic or non-periodic measurements of the process parameter being predicted via a PPM (process parameter measurement) link. This link may be connected to an input block, such as a AI block that receives inputs from a sensor or other device which measures the process parameter being predicted. Alternatively, this link may be connected to a manual input function block, such as the MI block 115 which may be in the host device 64 to receive manually entered measured values of the process parameter. If desired, the PPM link may also provide an estimate of the sample delay or the time at which the measurement was taken, which can be used by the virtual sensor function block 110 to determine the sample delay (Delay). Of course, the process variable measurement may be provided to the virtual sensor function block 110 by the operator via one of the host or workstations 64 in any other manner after obtaining such a measurement (and the corresponding time at which the measurement was taken) from, for example, a lab analysis or other analyzer unit. For example, an analyzer or other sensor which determines the measurement of the process parameter may be coupled to the process control system 60 and provide the output thereof to the virtual sensor function block 110 using any desired type of communications within the process control system 60. In this example, a sensor measuring the process parameter may be connected to the bus 70, to one of the input/output devices 86 or 88 or to the bus 90 to communicate with the virtual sensor function block 110. If desired, a device, such as a network analyzer, may be temporarily connected to the process control system 60 to download one or more measured samples of the parameter x (and its associated measurement time or time delay) to the virtual sensor function block 110.

Still further, the adjusted predicted output of the virtual sensor function block 110 may be used within the controller 62 or any other controller to perform process control, may be sent to the operator workstation 64 to be displayed to or otherwise used by the operator or by software within that workstation or may be sent to and used by any other device in the network 60. Likewise, the adaptive predictive model 10 may be placed at any other desired location within the process control system 60, such as within the workstations or within one or more of the devices (e.g., the device 62). In all cases, the adaptive predictive model 10 needs to be communicatively coupled to receive the selected inputs for the model as well as samples of the process parameter being predicted. It is also preferable to assure that the time or time delay associated in obtaining and providing the measured process parameter to the adaptive predictive model 110 or 10 is automatically provided to the model 110, 10.

While an adaptive predictive model has been described herein as being a function block within a process control system and, particularly, a DeltaV or a Fieldbus function block (which are very similar in nature), it will be understood that such an adaptive predictive model can be constructed as any type of program or device and that the different elements of the described adaptive predictive model of FIGS. 1–5 herein could be produced in or implemented in hardware, firmware or software stored on any type of computer memory, disk or other storage device. If implemented in software, the adaptive predictive model could be programmed using any desired programming language, may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the Internet, etc. (which is viewed as being the same as or interchangeable with providing such software via a transportable storage medium).

Also, while the adaptive predictive model has been described herein for use in a process control environment or network, it will be understood that an adaptive predictive model could be constructed according to the disclosure herein for use in any other field of endeavor (which are referred to herein as processes for the sake of convenience) that uses predictive models, such as a non-parametric model (e.g., neural network models), a natural model (e.g., a first principle model) or a parametric model (obtained by, for example, regression techniques) to produce estimates of parameters.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An adaptive predictive model for use in estimating a process parameter, the adaptive predictive model comprising:
    a predictive model configured to receive one or more model inputs and to produce a predicted value of the process parameter based on the one or more model inputs;
    a measurement input configured to receive a measurement of the process parameter; and
    a combiner network coupled to the measurement input to receive the process parameter measurement and coupled to the predictive model to receive the predicted value of the process parameter, said combiner network adapted to combine the process parameter measurement with the predicted value of the process parameter to produce an adjusted predicted value of the process parameter.

2. The adaptive predictive model of claim 1, wherein the combiner network includes a correction block that determines a correction factor and a summer that sums the correction factor to the predicted value of the process parameter to produce the adjusted predicted value of the process parameter.

3. The adaptive predictive model of claim 2, wherein the correction block includes a delay unit coupled to the predictive model to delay the predicted value of the process parameter, and a further summer that combines the delayed predicted value of the process parameter with the process parameter measurement.

4. The adaptive predictive model of claim 3, wherein the correction block includes a smoothing filter coupled between the further summer and the summer.

5. The adaptive predictive model of claim 4, wherein the smoothing filter is a low pass filter.

6. The adaptive predictive model of claim 2, wherein the combiner network includes a limit detector.

7. The adaptive predictive model of claim 6, wherein the limit detector includes limits that are configurable by a user.

8. The adaptive predictive model of claim 2, wherein the correction block includes a delay unit coupled to an output of the summer to receive and to delay the adjusted predicted value of the process parameter and includes a further summer that combines the delayed adjusted predicted value of the process parameter with the measured process parameter.

9. The adaptive predictive model of claim 8, wherein the correction block includes a smoothing filter coupled between the further summer and the summer.

10. The adaptive predictive model of claim 1, wherein the measurement input is also adapted to receive a time measurement indicative of the sample delay associated with the process parameter measurement.

11. The adaptive predictive model of claim 1, wherein the combiner network comprises a regressive least squares filter.

12. The adaptive predictive model of claim 1, wherein the combiner network includes a delay unit coupled to delay the predicted value of the process parameter, a multiplication unit that multiplies the delayed predicted value of the process parameter and the process parameter measurement by regressive least square coefficients and a summer that sums the multiplied delayed predicted value of the process parameter and the multiplied process parameter measurement to produce the adjusted predicted value of the process parameter.

13. The adaptive predictive model of claim 1, wherein the combiner network includes a multiplicity of delay units coupled to delay the predicted value of the process parameter by different delay amounts, a multiplication unit that multiplies each of the different delayed predicted values of the process parameter by different regressive least square coefficients and that multiplies the process parameter measurement by a further regressive least squares coefficient, and a summer that sums the multiplied delayed predicted values of the process parameter and the multiplied process parameter measurement to produce the adjusted predicted value of the process parameter.

14. The adaptive predictive model of claim 1, wherein the predictive model is a neural network model.

15. The adaptive predictive model of claim 1, wherein the predictive model is a natural model.

16. The adaptive predictive model of claim 1, wherein the predictive model is a recursive least squares model.

17. The adaptive predictive model of claim 1, wherein the predictive model is a parametric model.

18. The adaptive predictive model of claim 1, wherein the predictive model is a non-parametric model.

19. A method of adjusting an output of a predictive model that produces an estimate of a process parameter during operation of a process based on a series of inputs delivered to the predictive model, comprising the steps of:
   obtaining a measurement of the process parameter during operation of the process to produce a process parameter measurement;
   producing a correction factor using the measurement of the process parameter; and
   combining the correction factor with the output of the predictive model to produce an adjusted predictive model output that estimates the process parameter during operation of the process.

20. The method of claim 19, wherein the step of producing the correction factor includes the steps of delaying the output of the predictive model and determining the difference between the delayed output of the predictive model and the process parameter measurement.

21. The method of claim 20, wherein the step of producing the correction factor further includes the step of filtering the difference between the delayed output of the predictive model and the process parameter measurement.

22. The method of claim 20, wherein the step of combining includes the step of summing the correction factor to the output of the predictive model.

23. The method of claim 19, wherein the step of producing the correction factor includes the steps of delaying the adjusted predictive model output and determining the difference between the delayed adjusted predictive model output and the process parameter measurement.

24. The method of claim 23, wherein the step of producing the correction factor further includes the step of filtering the difference between the delayed adjusted predictive model output and the process parameter measurement.

25. The method of claim 24, wherein the step of combining includes the step of adding the correction factor to the output of the predictive model.

26. The method of claim 19, further including the step of producing a set of regressive least squares coefficients, wherein the step of producing the correction factor includes the steps of multiplying the process parameter measurement by one of the regressive least squares coefficients and wherein the step of combining includes the steps of delaying the output of the predictive model, multiplying the delayed output of the predictive model by one of the regressive least squares coefficients and summing the multiplied delayed output of the predictive model with the multiplied process parameter measurement to produce the adjusted predictive model output.

27. An adaptive predictive model, comprising:
   a memory;
   a predictive model stored on the memory and adapted to be implemented on a processor to produce a predicted value of a process parameter as an output;
   an input unit stored on the memory and adapted to be implemented on a processor to receive a measurement of the process parameter;
   a computation routine stored on the memory and adapted to be implemented on a processor to produce a correction factor from the measurement of the process parameter; and
   a combining routine stored on memory and adapted to be implemented on a processor to combine the correction factor with the predicted value of the process parameter to produce an adjusted predicted value of the process parameter.

28. The adaptive predictive model of claim 27, wherein the computation routine includes a delay unit that delays the output of the predictive model and a difference routine that determines the difference between the delayed output of the predictive model and the process parameter measurement.

29. The adaptive predictive model of claim 28, wherein the computation routine further includes a smoothing filter that filters the difference between the delayed output of the predictive model and the process parameter measurement.

30. The adaptive predictive model of claim 29, wherein the combining routine sums the correction factor to the predicted value of the process parameter output by the predictive model.

31. The adaptive predictive model of claim 27, wherein the computation routine includes a delay unit that delays the adjusted predicted value of the process parameter and a difference routine that determines the difference between the delayed adjusted predicted value of the process parameter and the process parameter measurement.

32. The adaptive predictive model of claim 31, wherein the computation routine includes a smoothing filter that filters the difference between the delayed adjusted predicted value of the process parameter and the process parameter measurement.

33. The adaptive predictive model of claim 32, wherein the combining routine sums the correction factor to the predicted value of the process parameter output by the predictive model.

34. The adaptive predictive model of claim 27, further including a regressive least squares routine stored on the memory and adapted to be executed on a processor to produce first and second regressive least squares coefficients, wherein the computation routine includes a multiplier unit that multiplies the process parameter measurement by the first regressive least squares coefficient and wherein the combining routine includes a delay unit that delays the predicted value of the process parameter output by the predictive model, a multiplier that multiplies the delayed predicted value of the process parameter by the second least squares coefficient and a summer that sums the multiplied, delayed predicted value of the process parameter with the multiplied process parameter measurement to produce the adjusted predicted value of the process parameter.

35. The adaptive predictive model of claim 27, wherein the predictive model, the computation routine and the combining routine form a function block.

36. The adaptive predictive model of claim 35, wherein the function block is a Fieldbus protocol function block.

37. The adaptive predictive model of claim 35, wherein the input unit is a manual input function block.

38. The adaptive predictive model of claim 35, further including a manual input function block coupled to the input unit and adapted to communicate the process parameter measurement to the input unit.

39. The adaptive predictive model of claim 35, further including a further input function block coupled to the input unit and adapted to communicate the process parameter measurement to the input unit.

40. The adaptive predictive model of claim 39, wherein the further input function block is adapted to communicate an indication of the sample time associated with the process parameter measurement to the input unit.

41. The adaptive predictive model of claim 1, wherein the measurement of the process parameter is received at the measurement input non-periodically.

42. The method of claim 19, wherein the measurement of the process parameter is performed non-periodically.

43. The adaptive predictive model of claim 27, wherein the measurement of the process parameter is received non-periodically.

44. An adaptive predictive model for use in estimating a process parameter, the adaptive predictive model comprising:
   a predictive model configured to receive one or more model inputs and to produce a predicted value of the process parameter based on the one or more model inputs;
   a measurement input configured to receive a non-periodic measurement of the process parameter; and
   a combiner network coupled to the measurement input to receive the process parameter measurement and coupled to the predictive model to receive the predicted value of the process parameter, said combiner network adapted to combine the process parameter measurement with the predicted value of the process parameter to produce an adjusted predicted value of the process parameter.

* * * * *

UNITED STATES PATENT AND TRADEMARK OFFICE
CERTIFICATE OF CORRECTION

PATENT NO. : 6,760,716 B1
DATED : July 6, 2004
INVENTOR(S) : Ganesamoorthi et al.

It is certified that error appears in the above-identified patent and that said Letters Patent is hereby corrected as shown below:

Title page,
Item [56], References Cited, OTHER PUBLICATIONS,
"Feasibility and performance" reference, please delete "Data Engineering, 1989," and insert -- Data Engineering, 1989. --

Column 4,
Line 22, please delete "phenomena." and insert -- phenomena --.
Line 49, please delete "$Y_{adj}$" and insert -- $y_{adj}$ --.

Column 8,
Line 55, please delete "process." and insert -- process --.

Column 10,
Line 38, please delete "senor" and insert -- sensor --.

Signed and Sealed this

Sixteenth Day of November, 2004

JON W. DUDAS
*Director of the United States Patent and Trademark Office*